(12) United States Patent
Ajito

(10) Patent No.: US 8,111,302 B2
(45) Date of Patent: Feb. 7, 2012

(54) WHITE BALANCE CONTROL APPARATUS AND METHOD

(75) Inventor: Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 59 days.

(21) Appl. No.: 12/795,817

(22) Filed: Jun. 8, 2010

(65) Prior Publication Data

US 2010/0245618 A1    Sep. 30, 2010

Related U.S. Application Data

(63) Continuation of application No. PCT/JP2008/071348, filed on Nov. 25, 2008.

(30) Foreign Application Priority Data

Dec. 11, 2007   (JP) ................. 2007-319886

(51) Int. Cl.
    H04N 9/73    (2006.01)
(52) U.S. Cl. ..................... 348/223.1; 348/655
(58) Field of Classification Search ............ 348/223.1, 348/655
    See application file for complete search history.

(56) References Cited

U.S. PATENT DOCUMENTS

| | | |
|---|---|---|
| 2002/0106206 A1 | 8/2002 | Takeshita |
| 2003/0035156 A1* | 2/2003 | Cooper ................. 358/516 |
| 2005/0195290 A1* | 9/2005 | Takeshita ............... 348/223.1 |
| 2006/0182338 A1* | 8/2006 | Toyoda et al. .......... 382/167 |
| 2008/0030814 A1* | 2/2008 | Ohara et al. ............ 358/522 |
| 2009/0207274 A1* | 8/2009 | Park et al. ............. 348/223.1 |

FOREIGN PATENT DOCUMENTS

| | | |
|---|---|---|
| JP | 4-371088 A | 12/1992 |
| JP | 11-308634 A | 11/1999 |
| JP | 2002-77937 A | 3/2002 |
| JP | 2002-290988 A | 10/2002 |
| JP | 2002-315015 A | 10/2002 |
| JP | 2003-224863 A | 8/2003 |
| JP | 2003-264850 A | 9/2003 |

OTHER PUBLICATIONS

International Search Report and Written Opinion dated Jan. 6, 2009 (in English) in counterpart International Application No. PCT/JP2008/071348.
International Preliminary Report on Patentability dated Aug. 19, 2010 (in English) in parent International Application No. PCT/JP2008/071348.

* cited by examiner

Primary Examiner — Tuan Ho
Assistant Examiner — Shahbaz Nazrul
(74) Attorney, Agent, or Firm — Holtz, Holtz, Goodman & Chick, PC

(57) ABSTRACT

An apparatus includes an evaluation acquisition unit, a chromaticity value calculation unit, a weight coefficient calculation unit, a histogram analysis unit, an appearance at a light source calculation unit, a white balance coefficient calculation unit, and a white balance operating unit. the evaluation acquisition unit acquires color signal values from image data. The chromaticity value calculation unit calculates chromaticity values from the color signal values. The weight coefficient calculation unit extracts a signal value as a lightness value, and calculates a weight coefficient determined by the lightness value. The histogram analysis unit calculates the center position of a histogram, a histogram multiplication value and a histogram dispersion value. The appearance at a light source calculation unit calculates an appearance at a light source for each color temperature. The white balance operating unit executes a white balance operation with respect to the image data using a white balance coefficient.

19 Claims, 13 Drawing Sheets

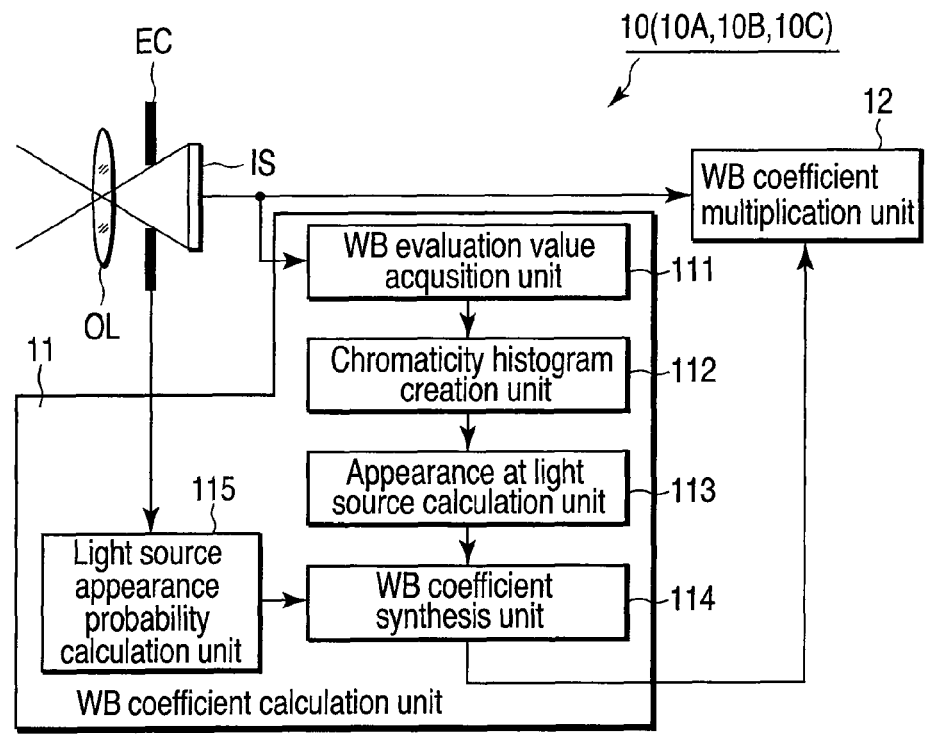
F I G. 1
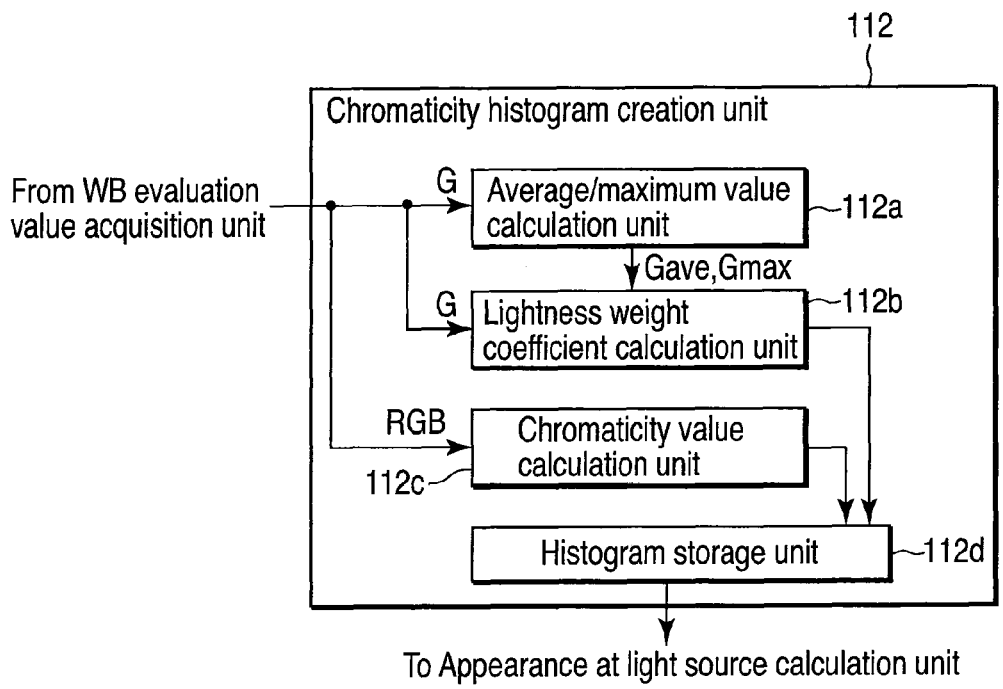
F I G. 2

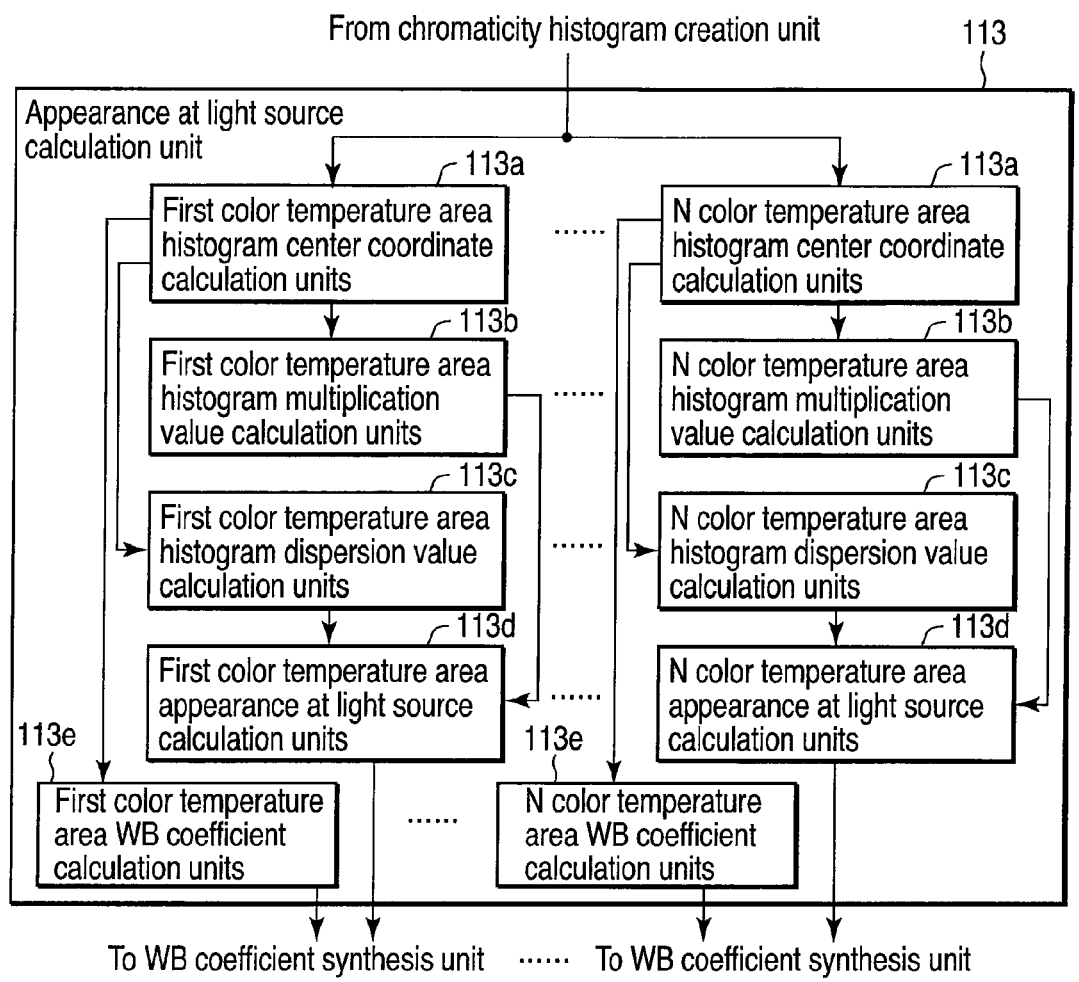
F I G. 5
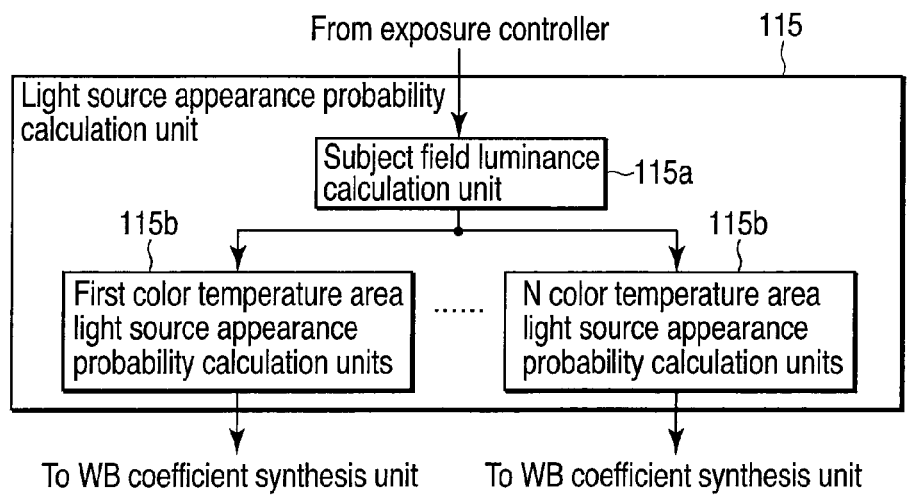
F I G. 6

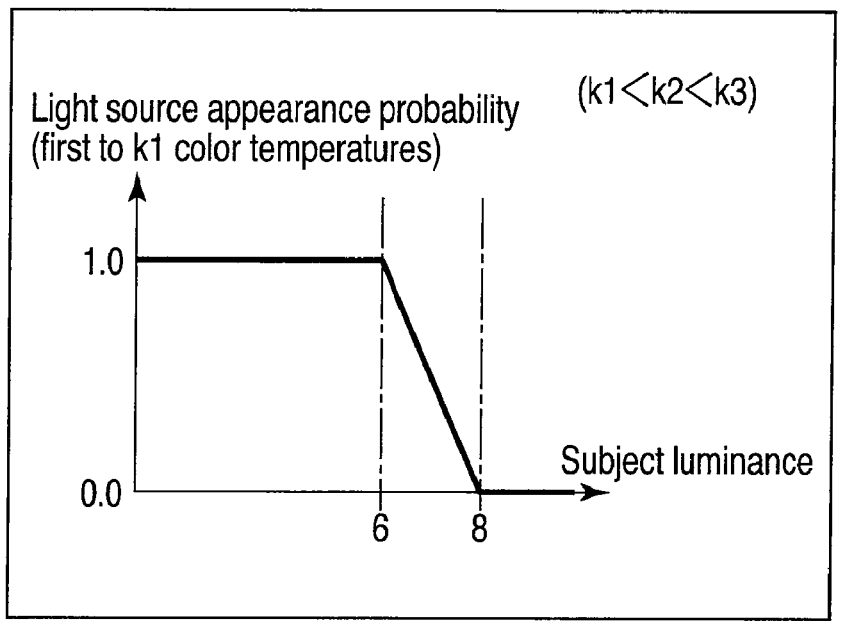
F I G. 7A
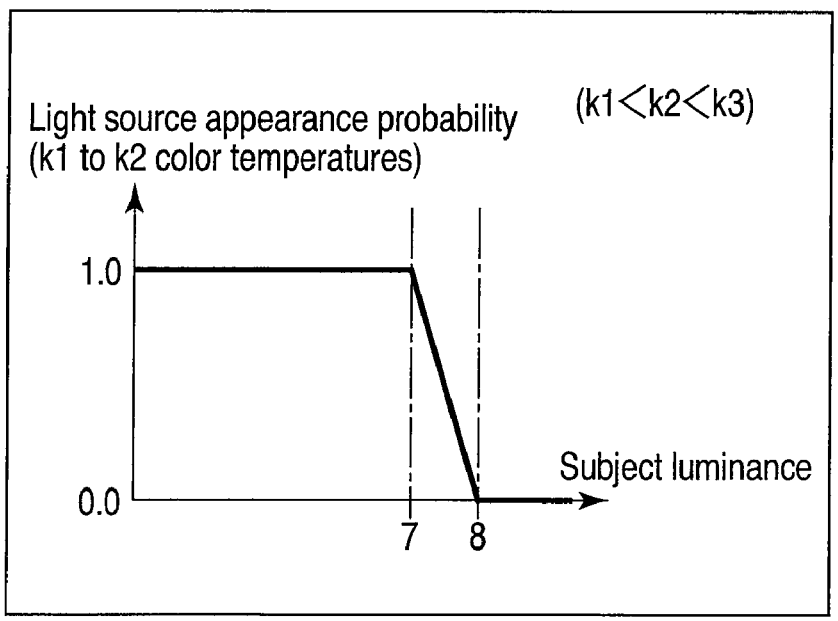
F I G. 7B

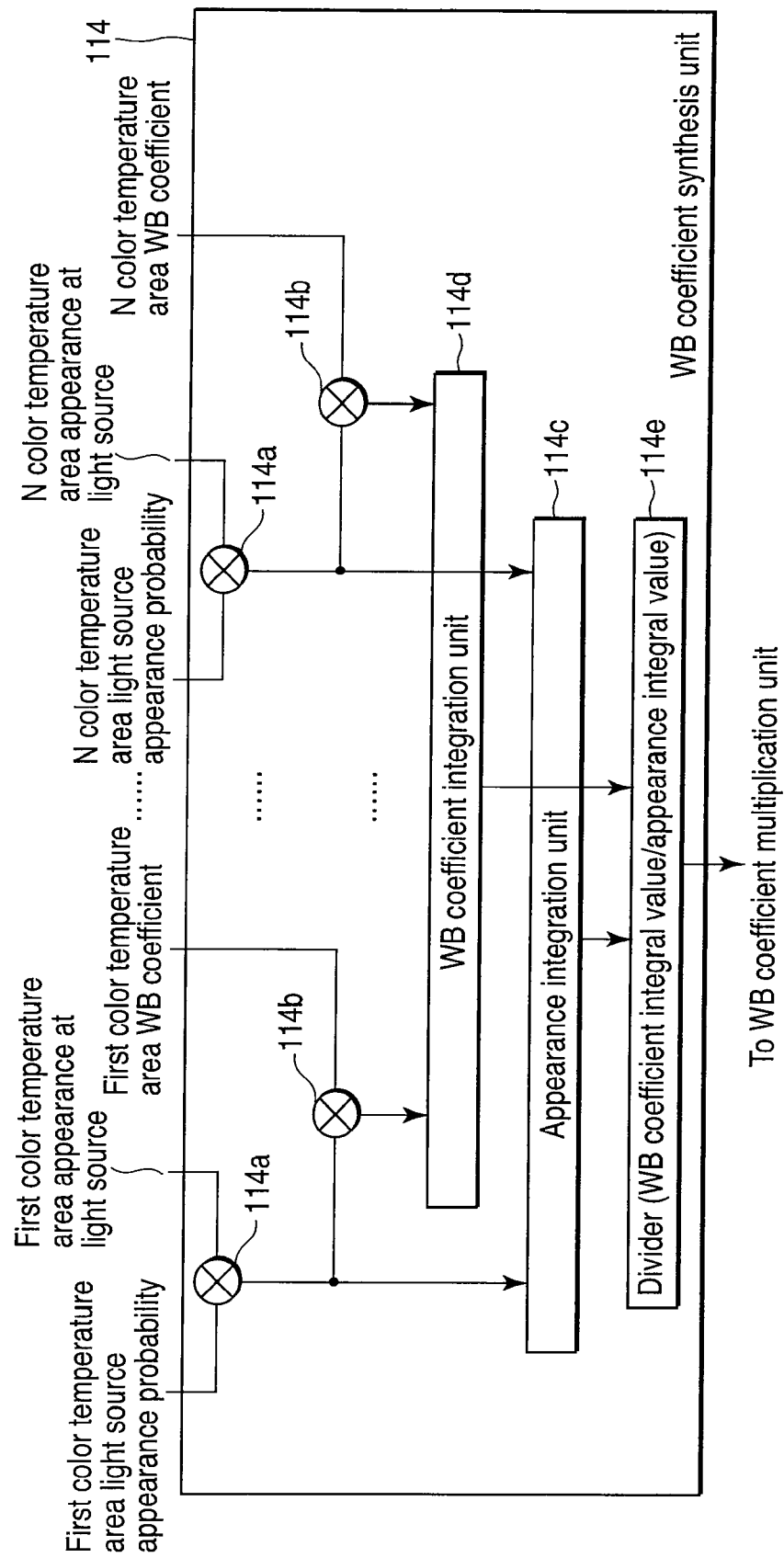
F I G. 8

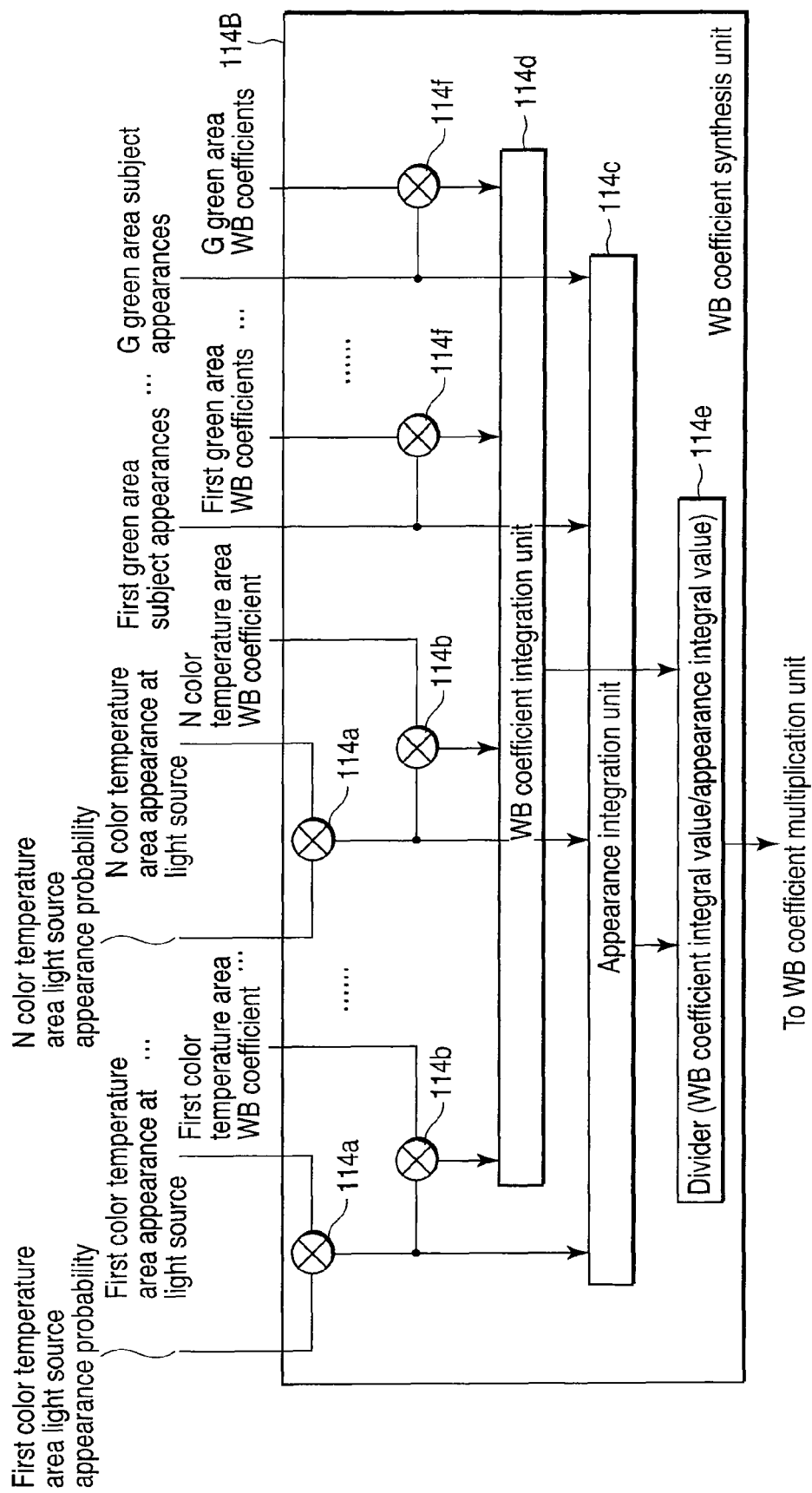
F I G. 11

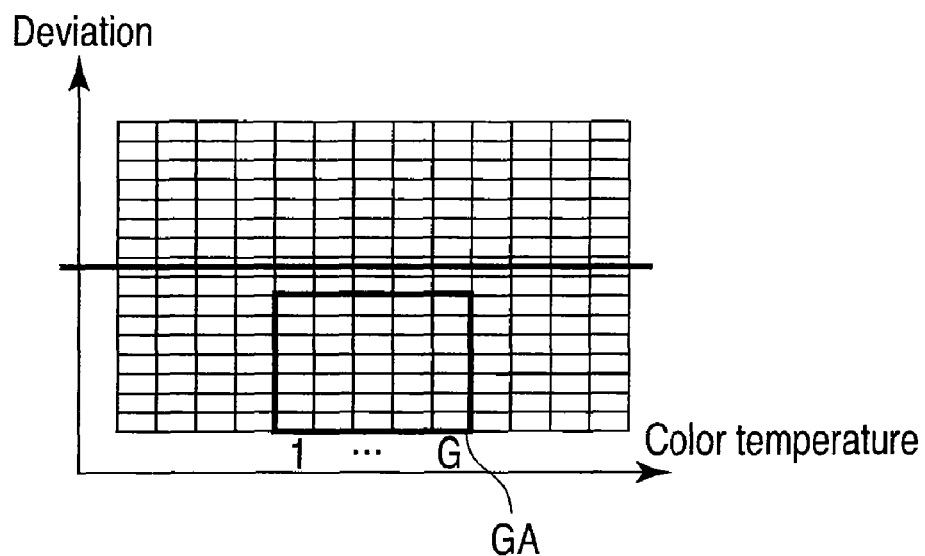
F I G. 12A
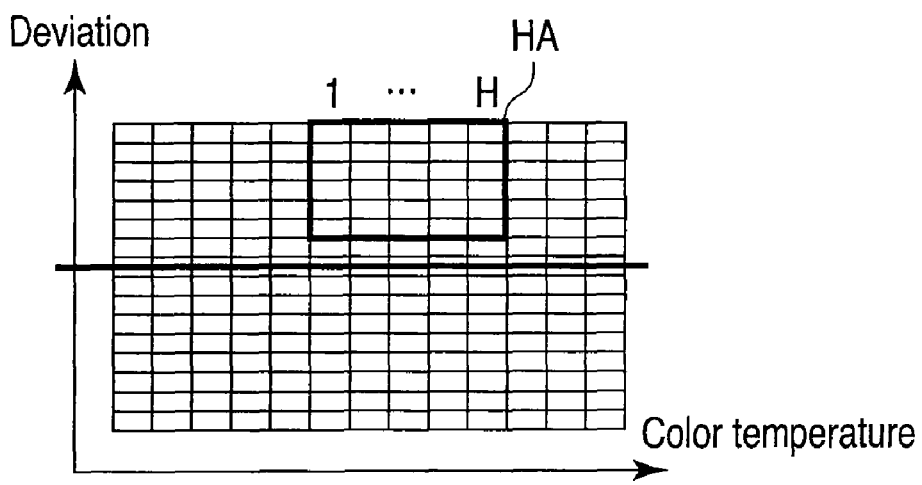
F I G. 12B

WHITE BALANCE CONTROL APPARATUS AND METHOD

CROSS REFERENCE TO RELATED APPLICATIONS

This is a Continuation Application of PCT Application No. PCT/JP2008/071348, filed Nov. 25, 2008, which was published under PCT Article 21(2) in Japanese.

This application is based upon and claims the benefit of priority from prior Japanese Patent Application No. 2007-319886, filed Dec. 11, 2007, the entire contents of which are incorporated herein by reference.

BACKGROUND OF THE INVENTION

1. Field of the Invention

The present invention relates to white balance control apparatus and method preferable for a digital camera and a video camera, which have a solid-state imaging device.

2. Description of the Related Art

In general, a digital camera and a video camera have an automatic white balance control function of automatically correcting a color balance so that the color of a white light source becomes an achromatic color. According to the foregoing function, a chromatic adaptation effect in human vision is falsely added to image data captured. In this way, it is possible to obtain an image having a hue such that something does not feel wrong.

According to a conventional white balance control, there are the following two methods. One is a method of measuring white using an output of a photometric sensor independently from an imaging device of a camera. The other is a method of directly detecting white from image data output from an imaging device.

The foregoing former, that is, the method of using a photometric sensor has the following problems. Specifically, special parts different from a general imaging system are required; for this reason, the cost is high. In addition, an imaging range does not necessarily match with a photometric range due to parallax; for this reason, an error is generated. Therefore, it is general to mainly employ the foregoing latter, that is, the method of directly detecting white from image data output from an imaging device.

If white is detected from captured imaged data, it is general to detect a color close to a black-body radiation locus color as white. In this case, for example, human skin color under daylight and a leaf color of plants under daylight are typically given; in other words, many colors close to a black body radiation locus color exist in a chromatic object color.

For this reason, the color of these chromatic colors is detected as white in error; as a result, correction is made using an erroneous white balance coefficient. Consequently, a problem of lacking the color of the chromatic subject frequently arises.

In order to solve the foregoing problem, the following technique is proposed. According to the technique, an imaging device is provided with a light source area close to a black body radiation locus. Further, skin color and green color areas slightly separating from the foregoing light source area are provided. Moreover, it is determined from the number or the direction of distributions belonging to the foregoing areas whether a target scene is a fluorescent lamp scene or a chromatic color subject scene. Simultaneously, it is determined based on a subject field luminance determined according to an exposure condition in shooting whether the target scene is an outdoor or indoor scene. In this way, it is possible to prevent overcorrection, which is made by detecting a chromatic color subject as a light source in error. (Jpn. Pat. Appln. KOKAI Publication No. 2003-264850)

Moreover, the following technique different from the foregoing technique is disclosed. According to the technique, it is determined from the dispersion of color distribution of the whole of an image whether or not the image is a color chart. In this way, the color chart thus determined is distinguished from a normal scene. (Jpn. Pat. Appln. KOKAI Publication No. H4-371088)

BRIEF SUMMARY OF THE INVENTION

According to an aspect of embodiments, an apparatus includes an evaluation acquisition unit acquiring color signal values at a plurality of pixel positions from image data, a chromaticity value calculation unit calculating chromaticity values corresponding to the pixel positions from the color signal values, a weight coefficient calculation unit extracting a signal value expressing a lightness component of the color signal values as a lightness value, and calculating a weight coefficient determined by the lightness value with respect to the pixel positions, a histogram analysis unit calculating the center position of a histogram, a histogram multiplication value at a neighborhood interval of the center position and a histogram dispersion value or color temperature with respect to a chromaticity space weighting histogram calculated based on a chromaticity value and a weight coefficient at each of the pixel positions, an appearance at a light source calculation unit calculating an appearance at a light source for each color temperature based on the histogram multiplication value and the histogram dispersion value, a white balance coefficient calculation unit calculating a white balance coefficient based on the appearance at a light source for each color temperature and the histogram center position for each color temperature, and a white balance operating unit executing a white balance operation with respect to the image data using a white balance coefficient calculated by the white balance coefficient calculation unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a white balance control apparatus according to a first embodiment of the present invention;

FIG. 2 is a block diagram showing the detailed configuration of a chromaticity histogram creation unit shown in FIG. 1 according to the first embodiment;

FIG. 5 is a block diagram showing the detailed configuration of an appearance at the light source calculation unit of FIG. 1 according to the first embodiment;

FIG. 6 is a block diagram showing the detailed configuration of a light source appearance probability calculation unit according to the first embodiment;

FIG. 7A is a chart to explain a function used for the light source appearance probability calculation unit every color temperature area of FIG. 6 according to the first embodiment;

FIG. 7B is a chart to explain a function used for the light source appearance probability calculation unit every color temperature area of FIG. 6 according to the first embodiment;

FIG. 8 is a block diagram showing the detailed configuration of a white balance (WB) coefficient synthesis unit shown in FIG. 1 according to the first embodiment;

FIG. 11 is a block diagram showing the detailed configuration of a white balance coefficient synthesis unit of a white balance control apparatus according to the third embodiment;

FIG. 12A is a chart to the concept of a green color area according to the third embodiment of the present invention;

FIG. 12B is a chart to the concept of a green color area according to a fourth embodiment of the present invention;

DETAILED DESCRIPTION OF THE INVENTION

First Embodiment

Figure 3:
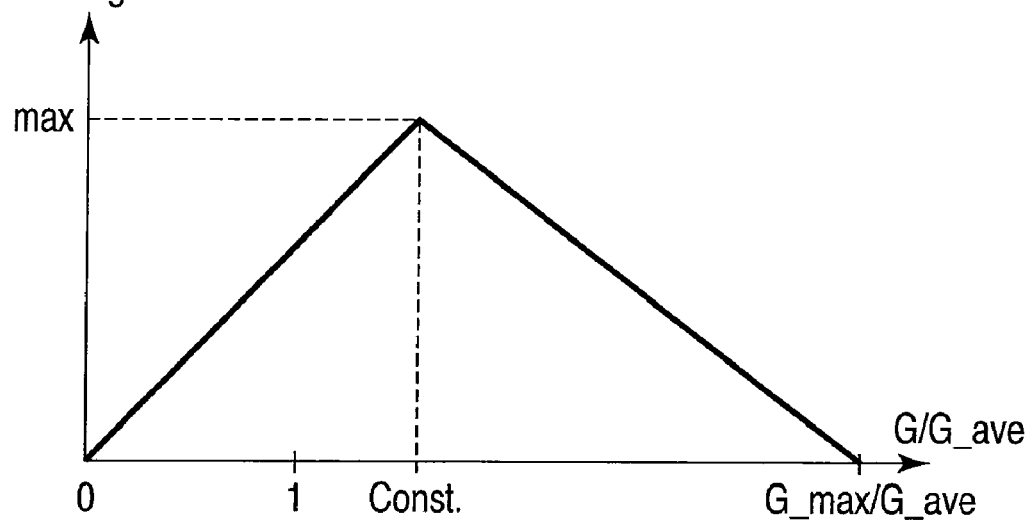
FIG. 3 is a graph to explain the relationship between a weight coefficient and a lightness calculated by a lightness weight coefficient calculation unit shown in FIG. 2 according to the first embodiment.

A first embodiment of the case where the present invention is applied to a white balance control apparatus used for a digital camera will be hereinafter described with reference to FIGS. 1 to 8.

FIG. 1 is a block diagram showing the configuration of a white balance control apparatus 10 according to this first embodiment. In FIG. 1, an optical image is formed on an image sensor IS such as a charge couple device (CCD). In this case, the optical image is collected by means of a lens optical system OL, and the quantity of transmitted light of the optical image is controlled by way of an exposure controller EC such an aperture stop.

An image signal obtained from photoelectric conversion by the foregoing image sensor IS is converted to an image data having a predetermined level digital value by way of an automatic gain control (AGC) amplifier and an analog-to-digital converter. Thereafter, the converted image data is supplied to a white balance (WB) coefficient calculation unit 11 and a white balance coefficient multiplication unit 12 configuring this white balance control apparatus 10.

The white balance (WB) coefficient calculation unit 11 comprises a white balance evaluation value acquisition unit 111, a chromaticity histogram creation unit 112, an appearance at the light source calculation unit 113, a white balance coefficient synthesis unit 114 and a light source appearance probability calculation unit 115.

The white balance evaluation value acquisition unit 111 acquires an evaluation value, which is the base of calculating a white balance coefficient, according to the image data from the image sensor IS. The chromaticity histogram creation unit 112 creates a histogram on a chromaticity plane based on the acquired evaluation value. The appearance at the light source calculation unit 113 calculates an appearance and an appearance position of each color temperature light source based on the created histogram.

The light source appearance probability calculation unit 115 calculates an appearance probability obtained from a shot luminance of each color temperature light source based on operation information by the foregoing exposure controller EC. The white balance coefficient synthesis unit 114 calculates a white balance coefficient based on the following information. One is an appearance probability of each color temperature light source calculated by the unit 115. Another is an appearance and an appearance position of each color temperature light source calculated by the foregoing appearance at the light source calculation unit 113. Then, the unit 114 outputs the calculated white balance coefficient to the foregoing white balance coefficient multiplication unit 12.

The white balance evaluation value acquisition unit 111 acquires color signal values (R, G and B values) on many pixel positions from image data obtained from the image sensor IS. In this case, the pixel position to be acquired may be optional; for example, pixels may be acquired from image data by sampling (thinning) for a predetermined time. Moreover, pixels may be acquired by interval integration for each predetermined interval. According to the foregoing any case, an evaluation value is effectively acquired considering processing time.

If there is no need to considering the influence of processing time, the color signal value may be acquired in the following manner. Specifically, the whole pixel positions obtained from imaging by the image sensor IS, for example, if the resolution of the image sensor IS is vertical 3000 pixels × horizontal 4000 pixels, color signal values equivalent to the total 12-million pixels are acquired. Therefore, pixels of the whole of image are effectively used to obtain an accurate evaluation value.

FIG. 2 is a block diagram showing the detailed configuration of the foregoing chromaticity histogram creation unit 112.

In the chromaticity histogram creation unit 112, an average/maximum value calculation unit 112a extracts a G-component value showing a lightness component from color signals obtained by the white balance evaluation value acquisition unit 111. Then, the unit 112a calculates an average value Gave and the maximum value Gmax from G component values of the whole pixel positions.

A lightness weight coefficient calculation unit 112b calculates a lightness weight coefficient determined by a lightness component of each pixel position based on the following values. One is a G-component value of each pixel position obtained by the white balance evaluation value acquisition unit 111. Another is an average value Gave and the maximum value Gmax of the G-component calculated by the foregoing average/maximum value calculation unit 112a.

FIG. 3 is a graph showing a lightness weight coefficient calculated by the lightness weight coefficient calculation unit 112b. As shown in FIG. 3, the lightness weight coefficient is determined in the following manner. Namely, a ratio G/Gave of G-component of each pixel position to the average value Gave of the G-component is calculated, and in accordance with the calculated ratio, the lightness weight coefficient is determined. The lightness weight coefficient is determined in accordance with the foregoing ratio; therefore, it is possible to obtain a lightness weight coefficient absorbing a change of a lightness value due to a change of shooting exposure condition.

As seen From FIG. 3, if the foregoing ratio is smaller than a predetermined value (1<Const.), high weight is set when a ratio is larger than the foregoing ratio. In this way, high weighting is made with respect to an evaluation value of a pixel having high lightness.

This means the following matters; specifically, if a lightness component is higher, it is evaluated as a light source color. Conversely, if the lightness component is lower, it is evaluated as being not a light source color (i.e., chromatic color subject). Moreover, if the foregoing ratio is larger than a predetermined value (1<Const.), low weight is set when a ratio is larger than the foregoing ratio. This means that if a pixel signal value is situated near saturation, the evaluation value should not be reliable.

A chromaticity value calculation unit 112c calculates a chromaticity value (R/G, B/G), which is a component independent from the lightness value, based on color signals (R, G and B values) obtained by the white balance evaluation value acquisition unit 111.

Based on a weight coefficient every evaluation value of each pixel position and the chromaticity value calculated in the foregoing manner, a histogram storage unit 112d creates a chromaticity histogram.

Figure 4A:
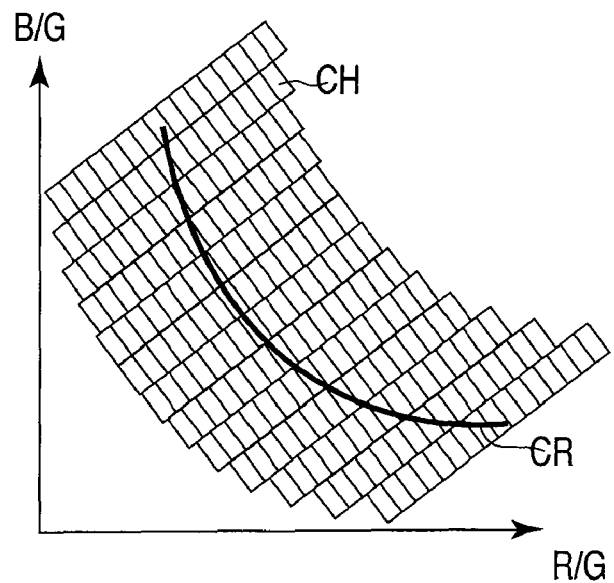
FIG. 4A is a chart to explain the concept of a histogram created by the chromaticity histogram creation unit of FIG. 1 according to the first embodiment.
Figure 4B:
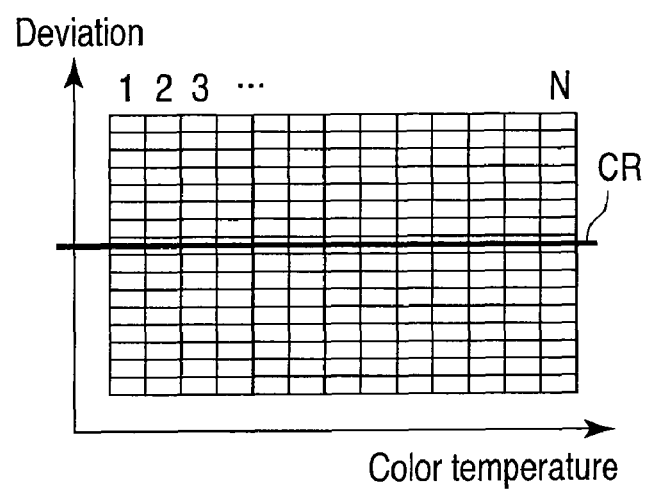
FIG. 4B is a chart to explain the concept of a histogram created by the chromaticity histogram creation unit of FIG. 1 according to the first embodiment.

FIG. 4A shows one example of a chromaticity histogram created by a histogram storage unit 112d. The same chromaticity histogram CH is defined as a two-dimensional histogram, which is set in the following manner. Specifically, the two-dimensional histogram is set with a predetermined interval width in the deviation direction with respect to a black body radiation locus CR every color temperature along a black body radiation locus on a R/G and B/G chromaticity space. The histograms shown in FIG. 4A are arranged, and thereby, the black body radiation locus CR is linearly extended, and further, as seen from FIG. 4B, a histogram coordinate is expressed having the color temperature axis and the deviation axis.

A frequency distribution is created with respect to a histogram interval thus set based on a chromaticity value for each evaluation value. In this case, considering a weight coefficient with respect to a lightness component, if the weight of an evaluation value is twice, the frequency is set as 2, and thereafter, stored in a histogram.

In the manner described above, a weighting histogram considering a lightness component of each evaluation value is created.

The detailed configuration of the appearance at the light source calculation unit 113 will be explained below with reference to FIG. 5.

The appearance at the light source calculation unit 113 includes histogram center coordinate calculation units 113a, histogram multiplication value calculation units 113b, histogram dispersion value calculation units 113c, appearance at the light source calculation units 113d and white balance coefficient calculation units 113e, which are corresponding to the first to N color temperature areas. The color temperature areas correspond to the number N of divided portions in the color temperature axial direction of a two-dimensional histogram created based on the foregoing chromaticity histogram.

Hereinafter, the foregoing histogram center coordinate calculation unit 113a, histogram multiplication value calculation unit 113b, histogram dispersion value calculation unit 113c, appearance at the light source calculation unit 113d and white balance coefficient calculation units 113e for each color temperature area will be detailedly explained.

The histogram center coordinate calculation unit 113a refers to a histogram (frequency distribution) of the deviation direction in the corresponding color temperature axis to find the center position of the histogram. Any of the following methods may be employed to fine the center position of the histogram. One is a method of calculating an average position from a frequency distribution of a histogram. Another is a method of searching a position of the maximum frequency of a histogram. Another is a method of calculating a median value of a histogram.

The obtained center position of the histogram is output to the next stage, that is, the foregoing histogram multiplication value calculation unit 113b, histogram dispersion value calculation unit 113c and white balance coefficient calculation units 113e.

The histogram multiplication value calculation unit 113b calculates a frequency integration value of a histogram at a predetermined neighborhood interval from the histogram center position obtained from the foregoing histogram center coordinate calculation unit 113a. Thereafter, the unit 113b outputs the calculated value to the appearance at the light source calculation unit 113d.

The histogram dispersion value calculation unit 113c calculates a variance of a histogram frequency distribution at a predetermined neighborhood interval from the histogram center position obtained from the foregoing histogram center coordinate calculation unit 113a. Thereafter, the unit 113b outputs the calculated value to the appearance at the light source calculation unit 113d.

Finally, the appearance at the light source calculation unit 113d calculates an appearance at the light source. The appearance at the light source shows what degree a light source component of a color temperature P exists in image data obtained from an imaging device. For example, an appearance t source is calculated based on a histogram multiplication value and a dispersion value. In this case, when the histogram multiplication value and the dispersion value at a color temperature p are set as S (p) and a variance D (p), respectively, an appearance at the light source I (p) is expressed by the following formula (1).

$$I(p)=S(p)\cdot[1-D(p)] \quad (1)$$

As can be seen from the foregoing formula (1), the appearance at the light source becomes high as the multiplication value becomes high, while becoming small as the dispersion becomes high. Therefore, an evaluation value having an expanse in a color distribution is not suitable as a light source; and thus, evaluated as a chromatic subject. This serves to reduce weight when white is detected.

The white balance coefficient calculation unit 113e calculates a white balance coefficients "1/(R/G)" "1/(B/G)" based on a chromaticity coordinate (R/G, B/G) from the histogram center position found by the histogram center coordinate calculation unit 113a every color temperature.

The foregoing process is carried out, and thereby, N couples of white balance coefficients and appearance at the light source every color temperature calculated by the foregoing white balance coefficient calculation unit 113e and appearance at the light source calculation unit 113d every color temperature area are calculated. Then, these N couples of white balance coefficients and appearance at the light source are output to the white balance coefficient synthesis unit 114.

The appearance at the light source calculation unit 115 will be detailedly explained below with reference to FIG. 6.

The appearance at the light source calculation unit 115 comprises a subject field luminance calculation unit 115a and N couples of light source appearance probability calculation units 115b corresponding to first to N color temperature areas. Specifically, the subject field luminance calculation unit 115a calculates a subject field luminance value from exposure conditions obtained from the exposure controller EC. The foregoing N couples of light source appearance probability calculation units 115b calculates a light source appearance probability every color temperature based on the subject field luminance value.

The foregoing subject field luminance calculation unit 115a calculates a subject field luminance value (BV). The subject field luminance value (BV) expresses an absolute luminance of an imaged (captured) scene. For example, when an ISO sensitivity value (SV), an aperture value (AV), a shutter velocity value (TV) are given as an exposure condition, a subject field luminance value is calculated from the following equation (2).

$$BV=SV+AV+TV \quad (2)$$

The light source appearance probability calculation unit 115b for each color temperature area calculates a light source appearance probability corresponding to each color temperature area based on the calculated subject field luminance value (BV). The light source appearance probability expresses a probability that a light source having a color temperature p exists in an imaged scene.

FIGS. 7A to 7D are charts showing a function corresponding to each color temperature area when a light source appearance probability is calculated.

Figure 7C:
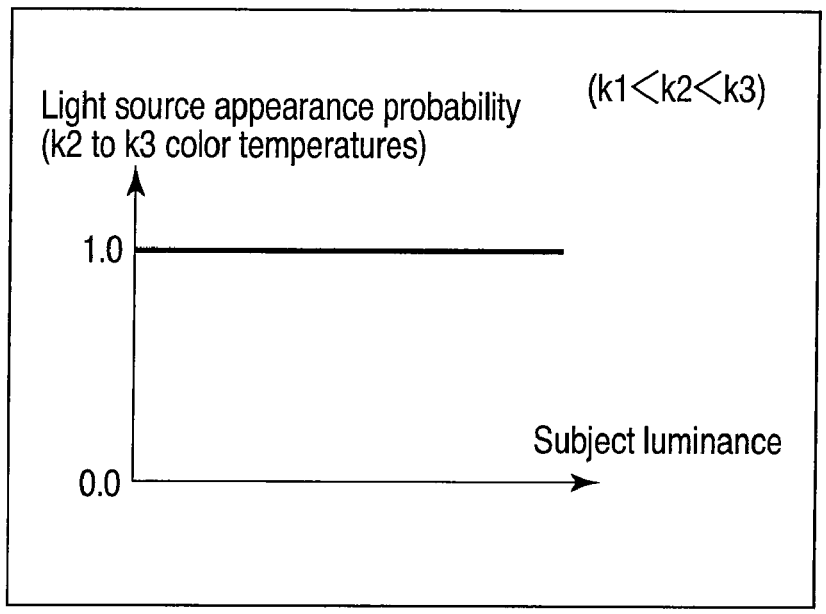
FIG. 7C is a chart to explain a function used for the light source appearance probability calculation unit every color temperature area of FIG. 6 according to the first embodiment.
Figure 7D:
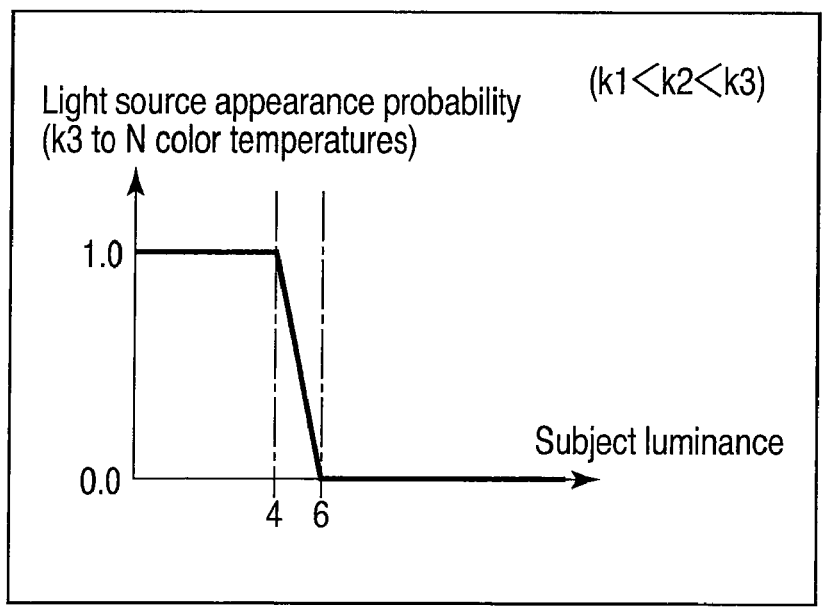
FIG. 7D is a chart to explain a function used for the light source appearance probability calculation unit every color temperature area of FIG. 6 according to the first embodiment.

FIG. 7A shows a light source appearance probability of a color temperature area (1 to k1) corresponding to a shade. FIG. 7B shows a light source appearance probability of a color temperature area (k1 to k2) corresponding to a cloudy day. FIG. 7C shows a light source appearance probability of a color temperature area (k2 to k3) corresponding to daylight (fine day). FIG. 7D shows a light source appearance probability of a color temperature area (k3 to N) corresponding to a fluorescent lamp and a light bulb.

Light source appearance probabilities of color temperature areas corresponding to the foregoing shade, cloudy day, fluorescent lamp and light bulb given as a light source become very low when a subject field luminance value become high in some degree. On the other hand, a function is set so that the light source appearance probability of a color temperature area corresponding to daylight is constant in all subject field luminance ranges.

This serves to prevent a light source on the outdoor scene from being determined as a fluorescent lamp and a light bulb in error using the foregoing subject field luminance value.

The light source appearance probability for each color temperature thus calculated is output to the white balance coefficient synthesis unit 114.

The detailed configuration of the white balance coefficient synthesis unit 114 will be explained below with reference to FIG. 8.

In the white balance coefficient synthesis unit 114, a multiplier 114a executes multiplication of an appearance at the light source and a light source appearance probability for each color temperature calculated by the foregoing appearance at the light source calculation unit 113d and light source appearance probability calculation unit 115b every color temperature area. Then, the multiplier 114a outputs the product to a multiplier 114b and an appearance integration unit 114c.

The multiplier 114b multiplies the product of the multiplier 114a and a white balance coefficient for each color temperature area, and then, outputs the product to a white balance coefficient integration unit 114d.

The foregoing appearance integration unit 114c inputs the product of the multiplier 114a for each color temperature area to execute integral addition, and then, calculates an appearance integral value, and thereafter, outputs the value to a divider 114e.

On the other hand, the white balance coefficient integration unit 114d inputs the product of the multiplier 114b for each color temperature area to execute integral addition with respect to all color temperatures. Further, the unit 114d calculates a white balance coefficient integral value, and then, outputs the value to the divider 114e.

The divider 114e divides the white balance coefficient integral value from the white balance coefficient integration unit 114d by the appearance integral value from the appearance integration unit 114c to obtain the final white balance coefficient. Then, the divider 114e outputs the final white balance coefficient to the next stage, that is, the foregoing white balance coefficient multiplication unit 12.

The white balance coefficient multiplication unit 12 multiplies the white balance coefficient obtained from the white balance coefficient calculation unit 11 with respect to a plurality of color components of image data obtained from the image sensor IS, for example, R and B based on the finally calculated WB coefficient. In this way, the unit 12 outputs an image whose white balance is controlled.

According to this embodiment having the foregoing circuit configuration, something closer to a light source is weighted considering lightness and dispersion of each evaluation value based on the evaluation value obtained from the input image data. In this way, evaluation is made, and then, a white balance coefficient is obtained. Therefore, it is possible to realize a more accurate white balance control removing the influence of an arbitrary chromatic color in an image.

Second Embodiment

Figure 9:
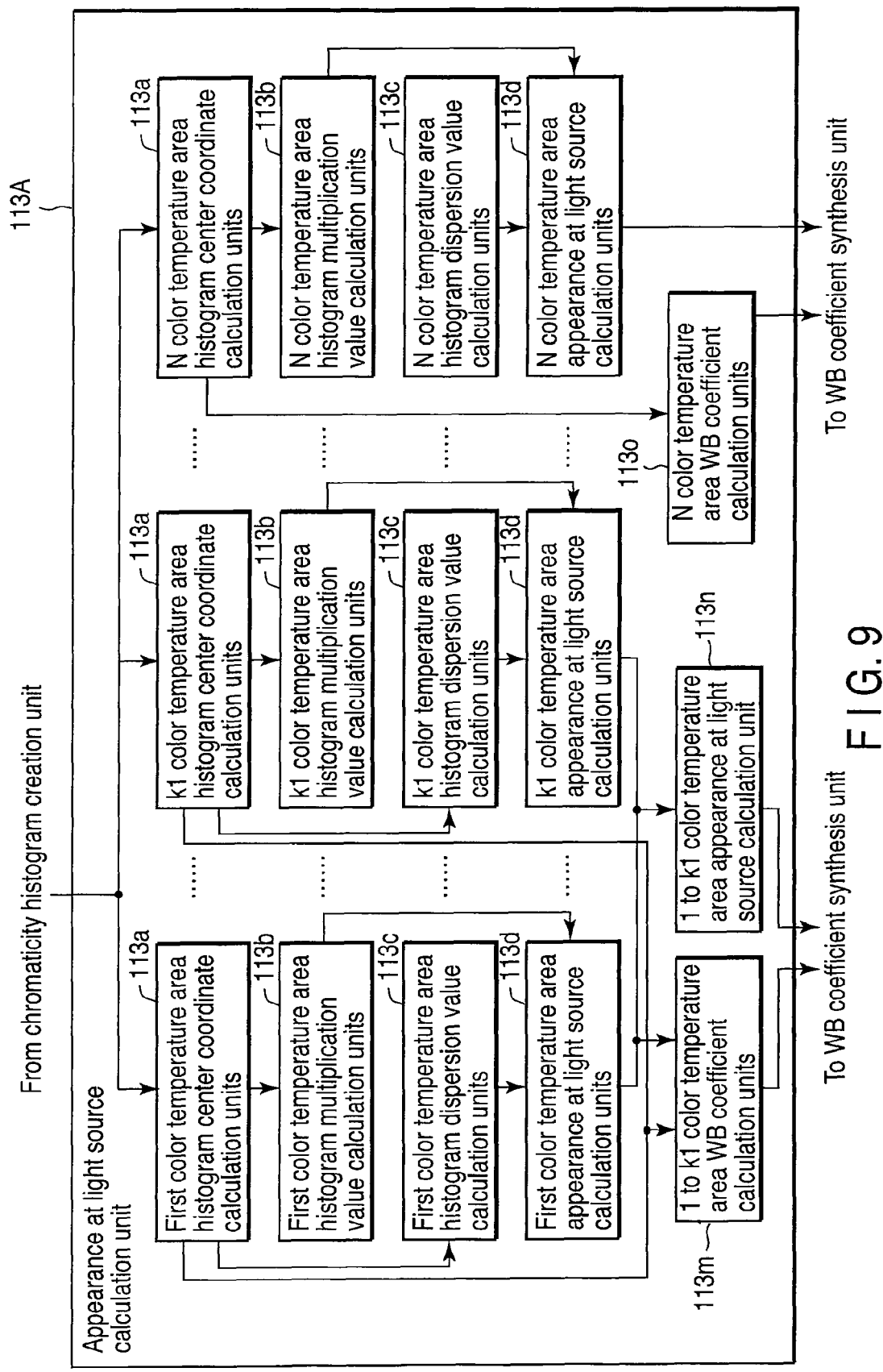
FIG. 9 is a block diagram showing the detailed configuration of a light source appearance probability calculation unit of a white balance control apparatus according to a second embodiment of the present invention.

A second embodiment of the case where the present invention is applied to a white balance control apparatus used for a digital camera will be hereinafter described with reference to FIG. 9.

A white balance control apparatus 10A according to this embodiment has basically the same configuration except the configuration of an appearance at the light source calculation unit 113. The same numbers are used to designate the identical portions, and its illustration and explanation are omitted.

FIG. 2 is a circuit diagram showing the detailed configuration of an appearance at the light source calculation unit 113A of this second embodiment in place of the appearance at the light source calculation unit 113 shown in FIG. 1.

The appearance at the light source calculation unit 113A comprises first to N color temperature area histogram center coordinate calculation units 113a, histogram multiplication value calculation units 113b, histogram dispersion value calculation units 113c and appearance at the light source calculation units 113d. The foregoing color temperature areas corresponds to the number of divided pieces of a two-dimensional histogram created based on the foregoing chromaticity histogram in the color temperature axis direction.

Moreover, the appearance at the light source calculation unit 113A is provided with a white balance coefficient calculation unit 113m and an appearance at the light source calculation unit 113n in place of N white balance coefficient calculation units 113 for each color temperature areas shown in FIG. 5. In this case, the foregoing units 113m and 113n are used in common to first to k1 (k1<N) color temperature areas. Further, the foregoing unit 113A is provided with a white balance coefficient calculation unit 113o, which is used for the final color temperature area, that is, N color temperature area only.

A histogram center coordinate calculated by each histogram center coordinate calculation unit 113a of first to k1 color temperature areas is supplied to the white balance coefficient calculation unit 113m. A histogram center coordinate calculated by each histogram center coordinate calculation unit 113a is supplied to the white balance coefficient calculation unit 113m. Moreover, an appearance at the light source calculated by each appearance at the light source calculation unit 113d of the same areas as above is supplied to the appearance at the light source calculation unit 113n.

Further, a histogram center coordinate calculated by an N color temperature area histogram center coordinate calculation unit 113a is supplied to the white balance coefficient calculation unit 113o. Moreover, an appearance at the light source calculated by an N color temperature area appearance at the light source calculation unit 113d is directly output to the nest stage, that is, the foregoing WB coefficient synthesis unit 114.

According to the foregoing circuit configuration, the appearance at the light source calculation unit 113n used in common to first to k1 color temperature areas creates an appearance at the light source distribution of first to k1 color temperature areas. In this case, the unit 113n creates the appearance at the light source distribution based on an appearance at the light source for each color temperature obtained from the pre-stage, that is, each appearance at the light source calculation unit 113d of first to k1 color temperature areas. Then, the unit 113n calculates a variance of the foregoing appearance at the light source distribution, and further, adds a weight based on the variance to the appearance at the light source of first to k1 color temperature areas. In this way, the unit 113n newly calculates a 1 to k1 color temperature appearance at the light source.

In this case, 1 to k1 color temperature area appearances at source are set as $I_{1 \sim k1}$, and each appearance at the light source of first to k1 color temperature areas is set as I (p), and further, a variance of the appearance at the light source distribution of first to k1 color temperature areas is set as $D_{1 \sim k1}$. Thus, $I_{1 \sim k1}$ is expressed by the following formula (2). That is, $$I_{1 \sim k1} = [1 - D_{1 \sim k1}] \cdot \sum_{p=1}^{k1} I(p) \tag{3}$$

Moreover, the 1 to k white balance coefficient calculation unit 113m calculates a histogram centroid position Q from the following formula (3). In this case, the unit 113m calculates the histogram centroid position Q based on the appearance at the light source for each color temperature and the histogram center position obtained from the pre-stage, that is, first to k1 color temperature area appearance at the light source calculation units 113d and histogram center coordinate calculation units 113a. Further, the unit 113m calculates a white balance coefficient value (1/(R/G), 1/(B/G) of first to k1 color temperature areas from a chromaticity value (R/G, B/G) corresponding to the histogram centroid position Q.

That is, $$Q = \frac{\sum_{p=1}^{k1} q(p) \cdot I(p)}{\sum_{p=1}^{k1} I(p)} \tag{4}$$

(where, q (p): histogram center position for each color temperature of first to k1 color temperature areas)

The 1 to k white balance coefficient calculation unit 113m outputs the white balance coefficient value and the appearance at the light source of first to k1 color temperature areas, which are calculated from the foregoing formula (4). In this way, the unit 113m calculates the final white balance coefficient.

As described above, according to this embodiment, the following effect is obtained in addition to the effect described in the foregoing first embodiment. Specifically, weighting is performed with respect to a light source evaluation value on a high color temperature side considering dispersion in the color temperature direction. In this way, it is possible to distinguish a high color temperature light source color from a blue subject color although in general, the case where the case where the dispersion of a blue subject broadens in the color temperature direction is more frequent.

Third Embodiment

A third embodiment of the case where the present invention is applied to a white balance control apparatus used for a digital camera will be hereinafter described with reference to FIGS. 10, 11 and 12A.

A white balance control apparatus 10B according to this embodiment has basically the same configuration except the configuration of an appearance at the light source calculation unit 113 and a white balance coefficient synthesis unit 114. The same numbers are used to designate the identical portions, and its illustration and explanation are omitted.

Figure 10:
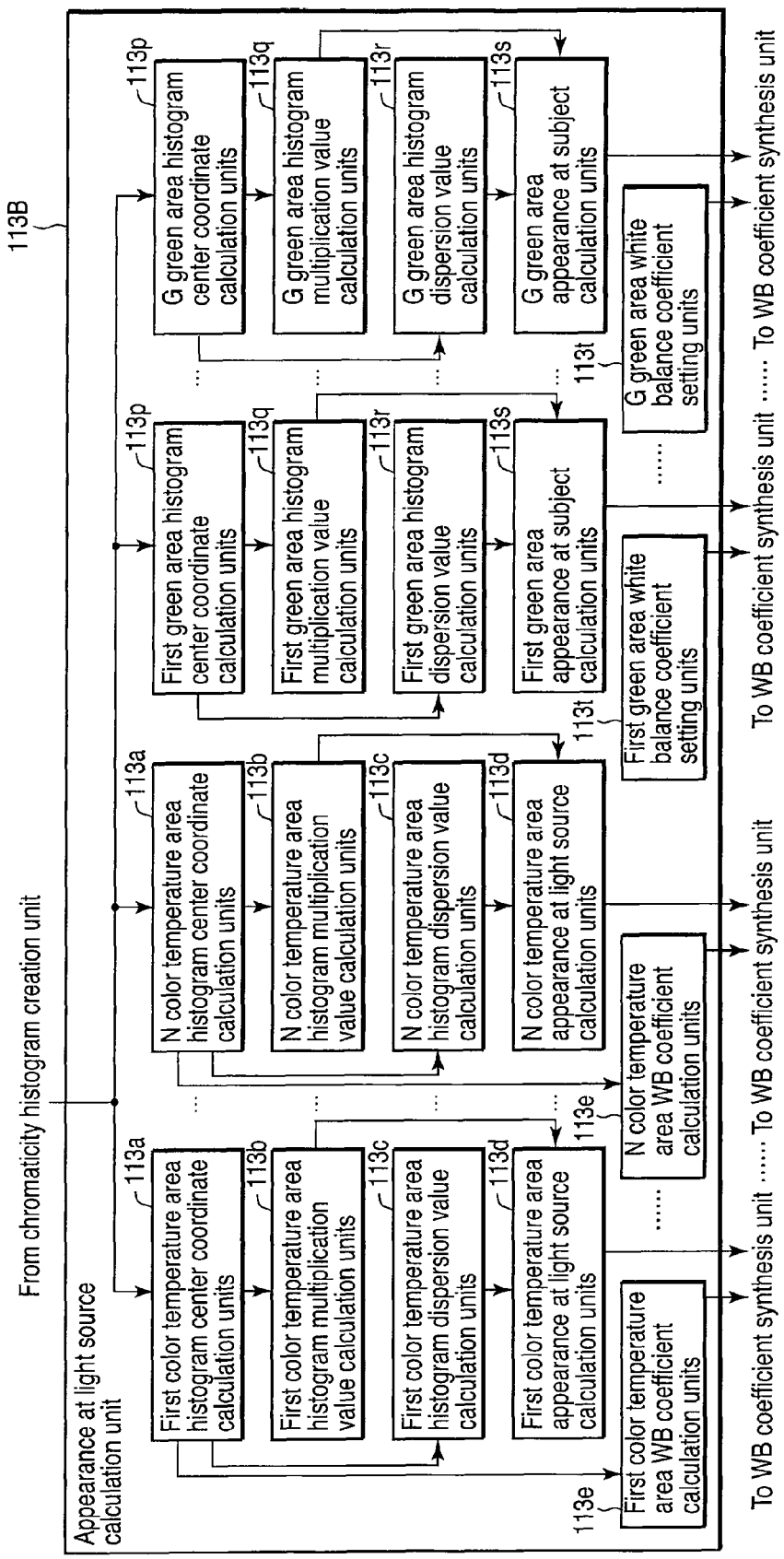
FIG. 10 is a block diagram showing the detailed configuration of a light source appearance probability calculation unit of a white balance control apparatus according to a third embodiment of the present invention.

FIG. 10 is a circuit diagram showing the detailed configuration of an appearance at the light source calculation unit 113B according to this third embodiment. As seen from FIG. 10, the appearance at the light source calculation unit 113B comprises the following units in addition to the foregoing histogram center coordinate calculation unit 113a, histogram multiplication value calculation unit 113b, histogram dispersion value calculation unit 113c, appearance at the light source calculating 113d and white balance coefficient calculation unit 113e, which correspond to first to N color temperature areas. Specifically, the unit 113B further includes first to G green area histogram center coordinate calculation units 113p, histogram multiplication value calculation units 113q, histogram dispersion value calculation units 113r, appearance at the subject calculation units 113s and white balance coefficient setting unit 113t.

In this case, the foregoing first to G green areas denote areas dividing a green area set on the color temperature histogram coordinate into a plurality of G.

The histogram center coordinate calculation unit 113p refers to a histogram (frequency distribution) of the deviation direction in the corresponding color temperature axis to find the center coordinate of the histogram. The histogram center coordinate may be found using any of the following methods. One is a method of finding a coordinate position from a frequency distribution of a histogram. Another is a method of searching a coordinate having the maximum frequency of a histogram. Another is a method of finding a histogram medium coordinate.

The found histogram center coordinate is output to the next stage, that is, the histogram multiplication value calculation unit 113q and the histogram dispersion value calculation unit 113r.

The histogram multiplication value calculation unit 113q calculates a histogram frequency integral value at a predetermined neighborhood interval from the histogram center coordinate from the histogram center coordinate calculation unit 113p. Then, the unit 113q outputs the calculated value to the appearance at the subject calculation unit 113s.

The histogram dispersion value calculation unit 113r calculates a variance of histogram frequency distribution at a predetermined neighborhood interval from the histogram center coordinate from the histogram center coordinate calculation unit 113p. Then, the unit 113r outputs the calculated value to the appearance at the subject calculation unit 113s.

The appearance at the subject calculation unit 113s calculates an appearance at the subject from the foregoing histogram multiplication value and dispersion value. The white balance coefficient setting unit 113t is previously stored with a predetermined white balance coefficient for each green area. The stored white balance coefficient is supplied directly to the white balance coefficient synthesis unit 114.

The detailed circuit configuration of a white balance coefficient synthesis unit 114B according to this embodiment will be explained below with reference to FIG. 11.

In the white balance coefficient synthesis unit 114B, a multiplier 114a multiplies an appearance at the light source and a light source appearance probability for each color temperature calculated by the foregoing appearance at the light source calculation unit 113d and light source appearance probability calculation unit every first to N color temperature area. The multiplier 114a outputs the product to a multiplier 114b and an appearance integration unit 114c.

The multiplier 114b multiplies the product of the multiplier 114a and a white balance coefficient for each color temperature area, and then, outputs the product to a white balance coefficient integration unit 114d.

In addition, the output of the appearance at the subject calculation unit 113s is supplied to a multiplier 114f for each first to G green areas, and further, directly supplied to the foregoing appearance integration unit 114c. The multiplier 114f multiplies an appearance at the subject output from the appearance at the subject calculation unit 113s and a white balance coefficient output from the white balance coefficient setting unit 113t. Then, the multiplier 114f outputs the product to the white balance coefficient integration unit 114d.

The foregoing appearance integration unit 114c inputs the product of the multiplier 114a for each color temperature area and the appearance at the subject for each green area to execute integral addition. Then, the unit 114c calculates an appearance integral value, and thereafter, outputs the value to a divider 114e.

On the other hand, the white balance coefficient integration unit 114d inputs the product of the multiplier 114b for each color temperature area and the product of the multiplier 114f for each green area to execute integral addition with respect to all color temperature areas and all green areas. Then, the unit 114d calculates a white balance coefficient integral value, and thereafter, outputs the value to the divider 114e.

The divider 114e divides the white balance coefficient integral value from the white balance coefficient integration unit 114d by the appearance integral value from the appearance integration unit 114c to obtain the final white balance coefficient. Then, the divider 114e outputs the final white balance coefficient to the nest stage, that is, the white balance coefficient multiplication unit 12.

The operation of the white balance coefficient synthesis unit 114B having the foregoing circuit configuration will be explained below.

FIG. 12A shows a green area GA set on the histogram coordinate, which is handled by each histogram center coordinate calculation unit 113p shown in FIG. 10. In this case, the histogram center position calculation unit for each green area GA finds the histogram center position with respect to a histogram frequency distribution of a green area GA at each color temperature shown in FIG. 12A.

The following positions and value are given as the histogram center position in the manner described above. For example, an average position may be calculated from a histogram frequency distribution. Further, a position, which has the maximum frequency of a histogram, may be calculated. Furthermore, the histogram medium value may be calculated.

The histogram multiplication value calculation unit 113q for each green area GA calculates a histogram frequency integral value at a predetermined neighborhood interval from the histogram center coordinate from the histogram center coordinate calculation unit 113p.

The histogram dispersion value calculation unit 113r for each green area AG calculates a variance of histogram frequency distribution at a predetermined neighborhood interval from the histogram center coordinate from the histogram center coordinate calculation unit 113p.

Finally, the appearance at the subject calculation unit 113s for each green area GA calculates an appearance at the subject based on the foregoing histogram multiplication value and dispersion value.

For example, a histogram multiplication value and a dispersion value at the g (g:1 to G natural numbers) green area GA are set as SG (g) and a variance DG (g). In this case, an appearance at the subject G (g) is calculated from the following equation (5). That is, $$G(g) = SG(g) \cdot DG(g) \quad (5)$$

As seen from the foregoing equation (5), the appearance at the subject has the following tendency. Specifically, the appearance at the subject becomes high as a multiplication value becomes large, and further, becomes large as a dispersion value becomes large.

Therefore, an evaluation value having a spread in a color distribution is defined as a value close to a chromatic subject, and thus, an appearance at the subject is calculated.

The white balance coefficient setting unit 113t for each green area GA presets a white balance coefficient estimated corresponding to each green area GA as a predetermined white balance coefficient.

In this way, the foregoing white balance coefficient and appearance at the subject for each green area calculated by the foregoing white balance coefficient setting unit 113t and appearance at the subject calculation unit 113s for each green area GA are calculated by G couples. Then, these G couples of white balance coefficients and appearance at the subjects are output to the foregoing white balance coefficient synthesis unit 114.

The foregoing operation is carried out, and thereby, it is possible to accurately detect a light source color from the evaluation value obtained from image data, and thus, to calculate a white balance coefficient. In addition, it is possible to calculate white balance coefficient using a green evaluation value. Therefore, even if no light source color exists in an image, the distribution of a green color such as a leaf at the outdoors is used, and thereby, a more accurate white balance control is carried out.

Moreover, the following green distribution is usable as a green evaluation value. Specifically, weighting is performed considering lightness value and dispersion value, and thereby, a green distribution is usable in a state of distinguishing from a light source color. In other words, a green distribution area using a light source estimation is broadened; for example, the green distribution is usable for a light source estimation considering a light green color such as "withered leaf" or a beige color. Therefore, this serves to achieve a white balance control having a more accuracy.

Fourth Embodiment

A fourth embodiment of the case where the present invention is applied to a white balance control apparatus used for a digital camera will be hereinafter described with reference to FIGS. 12B, 13 and 14.

A white balance control apparatus 100 according to this embodiment has basically the same configuration except the configuration of an appearance at the light source calculation unit 113 and a white balance coefficient synthesis unit 114. The same numbers are used to designate the identical portions, and its illustration and explanation are omitted.

Figure 13:
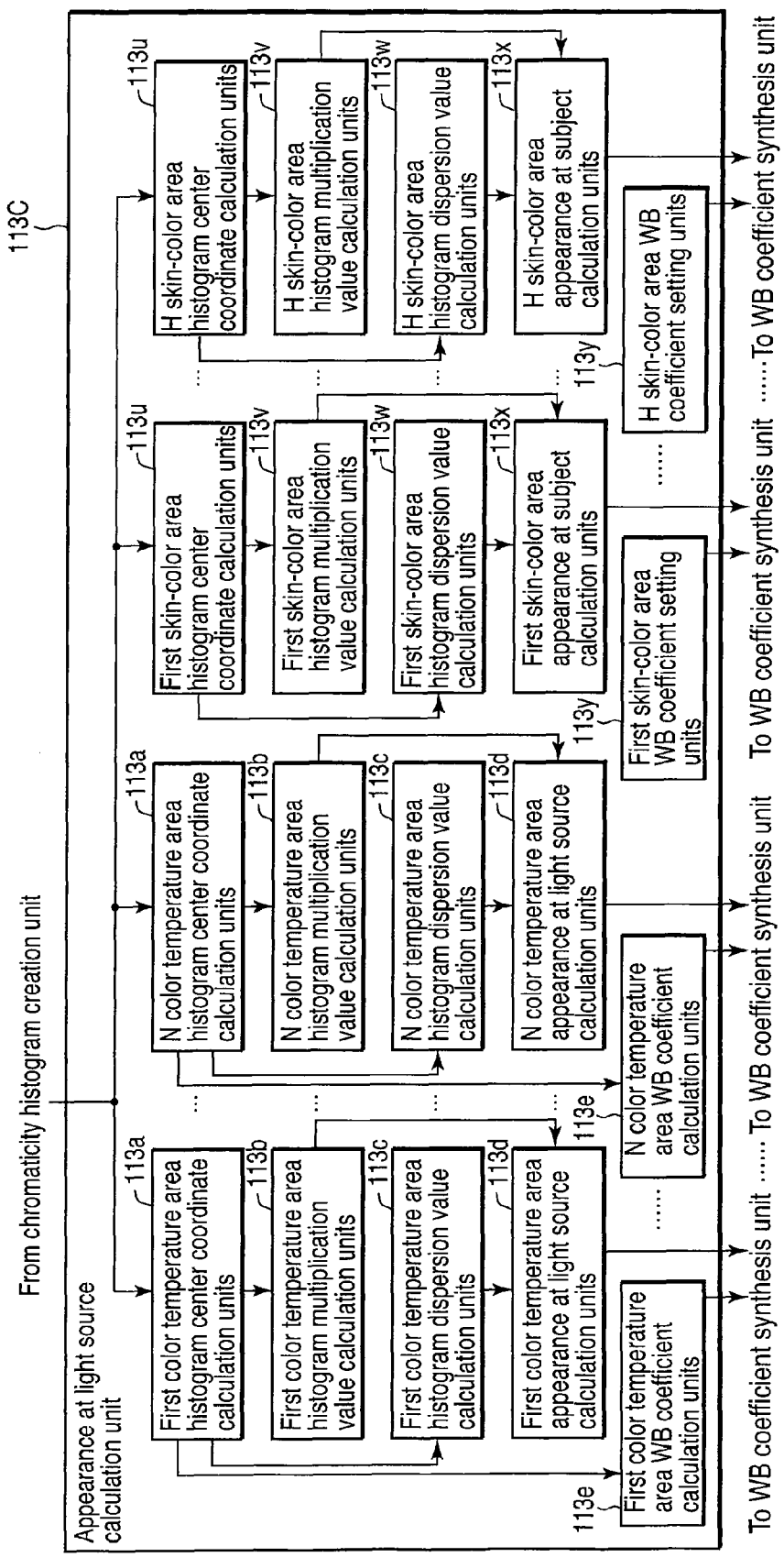
FIG. 13 is a block diagram showing the detailed configuration of a light source appearance probability calculation unit of a white balance control apparatus according to the fourth embodiment of the present invention.
Figure 14:
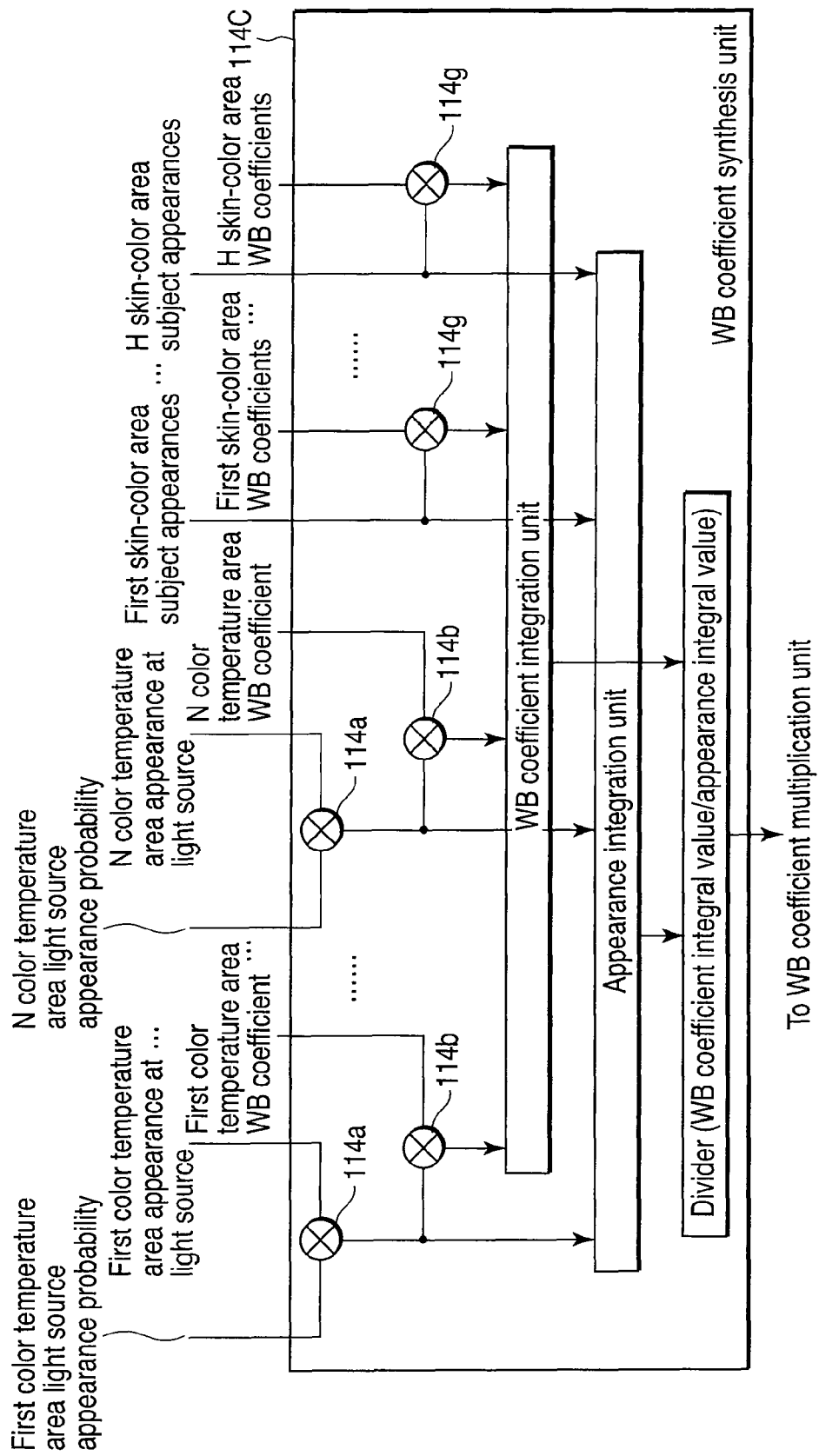
FIG. 14 is a block diagram showing the detailed configuration of a white balance coefficient synthesis unit according to the fourth embodiment.

FIG. 13 is a circuit diagram showing the detailed configuration of an appearance at the light source calculation unit 113C according to this fourth embodiment. As seen from FIG. 13, the appearance at the light source calculation unit 113C comprises the following units in addition to the foregoing histogram center coordinate calculation unit 113a, histogram multiplication value calculation unit 113b, histogram dispersion value calculation unit 113c, appearance at the light source calculation unit 113d and white balance coefficient calculation unit 113e, which correspond to first to N color temperature areas. Specifically, the unit 113C further includes first to H skin-color area histogram center coordinate calculation units 113u, histogram multiplication value calculation units 113v, histogram dispersion value calculation units 113w, appearance at the subject calculation units 113x and white balance coefficient setting unit 113y.

In this case, the foregoing first to H skin-color areas denote areas dividing a green area set on the color temperature histogram coordinate into a plurality of H.

The histogram center coordinate calculation unit 113u refers to a histogram (frequency distribution) of the deviation direction in the corresponding color temperature axis to find the center coordinate of the histogram. The histogram center coordinate may be found using any of the following methods. One is a method of finding a coordinate position from a frequency distribution of a histogram. Another is a method of searching a coordinate having the maximum frequency of a histogram. Another is a method of finding a histogram medium coordinate.

The found histogram center coordinate is output to the next stage, that is, the histogram multiplication value calculation unit 113v and the histogram dispersion value calculation unit 113w.

The histogram multiplication value calculation unit 113q calculates a histogram frequency integral value at a predetermined neighborhood interval from the histogram center coordinate from the histogram center coordinate calculation unit 113u. Then, the unit 113q outputs the calculated value to the appearance at the subject calculation unit 113x.

The histogram dispersion value calculation unit 113w calculates a variance of histogram frequency distribution at a predetermined neighborhood interval from the histogram center coordinate output from the histogram center coordinate calculation unit 113u. Then, the unit 113w outputs the calculated value to the appearance at the subject calculation unit 113x.

The appearance at the subject calculation unit 113x calculates an appearance at the subject from the foregoing histogram multiplication value and dispersion value. The white balance coefficient setting unit 113y is previously stored with a predetermined white balance coefficient for each skin-color area. The stored white balance coefficient is supplied directly to the white balance coefficient synthesis unit 114.

The detailed circuit configuration of a white balance coefficient synthesis unit 114C according to this embodiment will be explained below with reference to FIG. 14.

In the white balance coefficient synthesis unit 114C, a multiplier 114a multiplies an appearance at the light source and a light source appearance probability for each color temperature calculated by the foregoing appearance at the light source calculation unit 113d and light source appearance probability calculation unit every first to N color temperature area. The multiplier 114a outputs the product to a multiplier 114b and an appearance integration unit 114c.

The multiplier 114b multiplies the product of the multiplier 114a and a white balance coefficient for each color temperature area, and then, outputs the product to a white balance coefficient integration unit 114d.

In addition, the output of the appearance at the subject calculation unit 113x is supplied to a multiplier 114g for each first to H skin-color areas, and further, directly supplied to the foregoing appearance integration unit 114c. The multiplier 114g multiplies an appearance at the subject output from the appearance at the subject calculation unit 113x and a white balance coefficient output from the white balance coefficient setting unit 113y. Then, the multiplier 114g outputs the product to the white balance coefficient integration unit 114d.

The foregoing appearance integration unit 114c inputs the product of the multiplier 114a for each skin-color area and the appearance at the subject for each green area to execute integral addition. Then, the unit 114c calculates an appearance integral value, and thereafter, outputs the value to a divider 114e.

On the other hand, the white balance coefficient integration unit 114d inputs the product of the multiplier 114b for each color temperature area and the product of the multiplier 114g for each skin-color area to execute integral addition with respect to all color temperature areas and all green areas. Then, the unit 114d calculates a white balance coefficient integral value, and thereafter, outputs the value to the divider 114e.

The divider 114e divides the white balance coefficient integral value from the white balance coefficient integration unit 114d by the appearance integral value from the appearance integration unit 114c to obtain the final white balance coefficient. Then, the divider 114e outputs the final white balance coefficient to the nest stage, that is, the white balance coefficient multiplication unit 12.

The operation of the white balance coefficient synthesis unit 114C having the foregoing circuit configuration will be explained below.

FIG. 12B shows a skin-color area HA set on the histogram coordinate, which is handled by each histogram center coordinate calculation unit 113u shown in FIG. 13. In this case, the histogram center position calculation unit for each skin-color area HA finds the histogram center position with respect to a histogram frequency distribution of a skin-color area HA at each color temperature shown in FIG. 12B.

The following positions and value are given as the histogram center position in the manner described above. For example, an average position may be calculated from a histogram frequency distribution. Further, a position, which has the maximum frequency of a histogram, may be calculated. Furthermore, the histogram medium value may be calculated.

The histogram multiplication value calculation unit 113v for each skin-color area HA calculates a histogram frequency integral value at a predetermined neighborhood interval from the histogram center coordinate from the histogram center coordinate calculation unit 113u.

The histogram dispersion value calculation unit 113w for each skin-color area HG calculates a variance of histogram frequency distribution at a predetermined neighborhood interval from the histogram center coordinate from the histogram center coordinate calculation unit 113u.

Finally, the appearance at the subject calculation unit 113x for each skin-color area HA calculates an appearance at the subject based on the foregoing histogram multiplication value and dispersion value.

For example, a histogram multiplication value and a dispersion value at the h (h:1 to H natural numbers) skin-color area HA are set as SH (h) and a variance DH (h). In this case, an appearance at the subject H (h) is calculated from the following equation (6). That is, $$H(h)=SH(h)\cdot DH(h) \quad (6)$$

As seen from the foregoing equation (6), the appearance at the subject has the following tendency. Specifically, the appearance at the subject becomes high as a multiplication value becomes large, and further, becomes large as a dispersion value becomes large.

Therefore, an evaluation value having a spread in a color distribution is defined as a value close to a chromatic subject, and thus, an appearance at the subject is calculated.

The white balance coefficient setting unit 113y for each skin-color area HA presets a white balance coefficient estimated corresponding to each skin-color area HA as a predetermined white balance coefficient.

In this way, the foregoing white balance coefficient and appearance at the subject for each skin-color area calculated by the foregoing white balance coefficient setting unit 113y and appearance at the subject calculation unit 113x for each skin-color area HA are calculated by H couples. Then, these H couples of white balance coefficients and appearances at the subject are output to the foregoing white balance coefficient synthesis unit 114.

The foregoing operation is carried out, and thereby, it is possible to accurately detect a light source color from the evaluation value obtained from image data, and thus, to calculate a white balance coefficient. In addition, it is possible to calculate white balance coefficient using a skin-color evaluation value. Therefore, even if no light source color exists in an image, the distribution of a skin color such as a human is used, and thereby, a more accurate white balance control is carried out.

Moreover, the following skin-color distribution is usable as a skin-color evaluation value. Specifically, weighting is performed considering lightness value and dispersion value, and thereby, a skin-color distribution is usable in a state of distinguishing from a light source color. In other words, a green distribution area using a light source estimation is broadened; for example, the skin-color distribution is usable for a light source estimation considering a light skin color such as "makeup-worn skin" and "white race skin". Therefore, this serves to achieve a white balance control having a more accuracy.

The foregoing first to fourth embodiments relates to the case where the present invention is realized by a hardware circuit. However, the present invention is not limited to the foregoing hardware circuit. In this case, the present invention may be realized by software processing, which is capable of obtaining the same effect as above by executing a computer readable program.

Moreover, the present invention is applicable to a general image processing, for example, retouch allocation software in addition to an apparatus, which performs white balance control before recording image data acquired by an imaging device having a solid-state image sensor to a recording medium. According to the foregoing retouch allocation software, white balance control is carried out with respect to image data acquired by any means.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:
1. A white balance control apparatus comprising:
an evaluation acquisition unit acquiring color signal values at a plurality of pixel positions from image data;
a chromaticity value calculation unit calculating chromaticity values corresponding to the pixel positions from the color signal values;
a weight coefficient calculation unit extracting a signal value expressing a lightness component of the color signal values as a lightness value, and calculating a weight coefficient determined by the lightness value with respect to the pixel positions;
a histogram analysis unit calculating the center position of a histogram, a histogram multiplication value at a neighborhood interval of the center position and a histogram dispersion value or color temperature with respect to a chromaticity space weighting histogram calculated based on a chromaticity value and a weight coefficient at each of the pixel positions;
an appearance at a light source calculation unit calculating an appearance at a light source for each color temperature based on the histogram multiplication value and the histogram dispersion value;
a white balance coefficient calculation unit calculating a white balance coefficient based on the appearance at a light source for each color temperature and the histogram center position for each color temperature; and a white balance operating unit executing a white balance operation with respect to the image data using a white balance coefficient calculated by the white balance coefficient calculation unit.

2. The apparatus according to claim 1, further comprising:
a lightness average value calculation unit calculating an average value of a lightness value with respect to the pixel positions,
the weight coefficient calculation unit calculating the weight coefficient based on a ratio of a lightness value of each pixel position to the average value of the lightness value.

3. The apparatus according to claim 2, the weight coefficient calculation unit calculates a large weight coefficient when the ratio is high if the ratio is smaller than a predetermined value larger than 1 while calculating a small weight coefficient when the ratio is high if the ratio is larger than the predetermined value.

4. The apparatus according to claim 2, the appearance at a light source calculation unit calculates a high appearance when the histogram multiplication value for each color temperature is large, and calculates a high appearance when the histogram dispersion value for each color temperature is small.

5. The apparatus according to claim 1, further comprising:
a subject field luminance calculation unit calculating a subject field luminance based on an exposure condition in shooting; and
a light source appearance probability calculation unit calculating a light source appearance probability for each color temperature based on the subject field luminance,
the white balance coefficient calculation unit calculating a white balance coefficient using the light source appearance probability for each color temperature and the product of an appearance at a light source.

6. The apparatus according to claim 1, the evaluation value acquisition unit acquires a color signal value multiplying a pixel of a predetermined neighborhood area at each pixel position.

7. The apparatus according to claim 1, further comprising:
an appearance at a chromatic subject calculation unit calculating an appearance at a chromatic subject based on the histogram multiplication and dispersion values in a predetermined color temperature range of the chromaticity space; and
a white balance coefficient at a chromatic subject setting unit setting a white balance coefficient with respect to the chromatic subject,
the appearance at a chromatic subject calculation unit calculating a high appearance when the histogram multiplication value is large and calculating a high appearance when the histogram dispersion value is large,
the white balance coefficient calculation unit calculating a white balance coefficient considering the appearance at the chromatic subject and the white balance coefficient with respect to the chromatic subject.

8. A white balance control apparatus comprising:
an evaluation acquisition unit acquiring color signal values at a plurality of pixel positions from image data;
a chromaticity value calculation unit calculating chromaticity values corresponding to the pixel positions from the color signal values;
a lightness average value calculation unit extracting a signal value expressing a lightness component of the color signal values as a lightness value, and calculating an average value of a lightness value with respect to the pixel positions;

a weight coefficient calculation unit extracting a signal value expressing a lightness component of the color signal values as a lightness value, and calculating a weight coefficient determined based on a ratio of a lightness value of each pixel position to the average value of the lightness value with respect to the pixel positions;
a histogram analysis unit calculating the center position of the histogram and a histogram multiplication value for each color temperature of a chromaticity space with respect a weighting histogram of a chromaticity space calculated based on a chromaticity value and a weight coefficient at each of the pixel positions;
an appearance at a light source calculation unit calculating an appearance at a light source for each color temperature based on the histogram multiplication value;
a white balance coefficient calculation unit calculating a white balance coefficient based on the appearance at a light source for each color temperature and the histogram center position for each color temperature; and
a white balance operating unit executing a white balance operation with respect to the image data using a white balance coefficient calculated by the white balance coefficient calculation unit.

9. The apparatus according to claim 8, the weight coefficient calculation unit calculates a large weight coefficient when the ratio is high if the ratio is smaller than a predetermined value larger than 1 while calculating a small weight coefficient when the ratio is high if the ratio is larger than the predetermined value.

10. The apparatus according to claim 8, further comprising:
a subject field luminance calculation unit calculating a subject field luminance based on an exposure condition in shooting; and
a light source appearance probability calculation unit calculating a light source appearance probability for each color temperature based on the subject field luminance,
the white balance coefficient calculation unit calculating a white balance coefficient using the light source appearance probability for each color temperature and the product of an appearance at a light source.

11. The apparatus according to claim 8, the evaluation value acquisition unit acquires a color signal value multiplying a pixel of a predetermined neighborhood area at each pixel position.

12. A white balance control apparatus comprising:
an evaluation acquisition unit acquiring color signal values at a plurality of pixel positions from image data;
a chromaticity value calculation unit calculating chromaticity values corresponding to the pixel positions from the color signal values;
a histogram analysis unit calculating the center position of a histogram, a histogram multiplication value at a neighborhood interval of the center position and a histogram dispersion value for each color temperature of a chromaticity space with respect to a chromaticity space histogram calculated based on a chromaticity value at each of the pixel positions;
an appearance at a light source calculation unit calculating an appearance at a light source for each color temperature based on the histogram multiplication value and the histogram dispersion value;
a white balance coefficient calculation unit calculating a white balance coefficient based on the appearance at a light source for each color temperature and the histogram center position for each color temperature; and a white balance operating unit executing a white balance operation with respect to the image data using a white balance coefficient calculated by the white balance coefficient calculation unit.

13. The apparatus according to claim 12, the appearance at a light source calculation unit calculates a high appearance when the histogram multiplication value for each color temperature is large, and calculates a high appearance when the histogram dispersion value for each color temperature is small.

14. The apparatus according to claim 12, further comprising:
a subject field luminance calculation unit calculating a subject field luminance based on an exposure condition in shooting; and
a light source appearance probability calculation unit calculating a light source appearance probability for each color temperature based on the subject field luminance,
the white balance coefficient calculation unit calculating a white balance coefficient using the light source appearance probability for each color temperature and the product of an appearance at a light source.

15. The apparatus according to claim 12, the evaluation value acquisition unit acquires a color signal value multiplying a pixel of a predetermined neighborhood area at each pixel position.

16. The apparatus according to claim 12, further comprising:
an appearance at a chromatic subject calculation unit calculating an appearance at the chromatic subject based on the histogram multiplication and dispersion values in a predetermined color temperature range of the chromaticity space,
the appearance at a chromatic subject calculation unit calculating a high appearance when the histogram multiplication value is large and calculating a high appearance when the histogram dispersion value is large,
the white balance coefficient calculation unit calculating a white balance coefficient considering the appearance at the chromatic subject and a white balance coefficient with respect to the chromatic subject.

17. A white balance control method comprising:
an evaluation acquiring step of acquiring color signal values at a plurality of pixel positions from image data;
a chromaticity value calculating step of calculating chromaticity values corresponding to the pixel positions from the color signal values;
a weight coefficient calculating step of extracting a signal value expressing a lightness component of the color signal values as a lightness value, and calculating a weight coefficient determined by the lightness value with respect to the pixel positions;
a histogram analyzing step of calculating the center position of a histogram, a histogram multiplication value at a neighborhood interval of the center position and a histogram dispersion value for color temperature with respect to a chromaticity space weighting histogram calculated based on a chromaticity value and a weight coefficient at each of the pixel positions;
an appearance at a light source calculating step of calculating an appearance at a light source for each color temperature based on the histogram multiplication value and the histogram dispersion value;
a white balance coefficient calculating step of calculating a white balance coefficient based on the appearance at a light source for each color temperature and the histogram center position for each color temperature; and
a white balance operating step of executing a white balance operation with respect to the image data using a white balance coefficient calculated by the white balance coefficient calculating step.

18. A white balance control method comprising:
an evaluation acquiring step of acquiring color signal values at a plurality of pixel positions from image data;
a chromaticity value calculating step of calculating chromaticity values corresponding to the pixel positions from the color signal values;
a lightness average value calculating step of extracting a signal value expressing a lightness component of the color signal values as a lightness value, and calculating an average value of a light ness value with respect to the pixel positions;
a weight coefficient calculating step of extracting a signal value expressing a lightness component of the color signal values as a lightness value, and calculating a weight coefficient determined based on a ratio of a lightness value of each pixel position to the average value of the lightness value with respect to the pixel positions;
a histogram analyzing step of calculating the center position of the histogram and a histogram multiplication value for each color temperature of a chromaticity space with respect to a weighting histogram of a chromaticity space calculated based on a chromaticity value and a weight coefficient at each of the pixel positions;
an appearance at a light source calculating step of calculating an appearance at a light source for each color temperature based on the histogram multiplication value;
a white balance coefficient calculating step of calculating a white balance coefficient based on the appearance at a light source for each color temperature and the histogram center position for each color temperature; and
a white balance operating step of executing a white balance operation with respect to the image data using a white balance coefficient calculated by the white balance coefficient calculating step.

19. A white balance control method comprising:
an evaluation acquiring step of acquiring color signal values at a plurality of pixel positions from image data;
a chromaticity value calculating step of calculating chromaticity values corresponding to the pixel positions from the color signal values;
a histogram analyzing step of calculating the center position of a histogram, a histogram multiplication value at a neighborhood interval of the center position and a histogram dispersion value a histogram dispersion value for each color temperature of a two-dimensional chromaticity space with respect to a chromaticity space histogram calculated based on a chromaticity value at each of the pixel positions;
an appearance at a light source calculating step of calculating an appearance at a light source for each color temperature based on the histogram multiplication value and the histogram dispersion value;
a white balance coefficient calculating step of calculating a white balance coefficient based on the appearance at a light source for each color temperature and the histogram center position for each color temperature; and
a white balance operating step of executing a white balance operation with respect to the image data using a white balance coefficient calculated by the white balance coefficient calculating step.

* * * * *